US012166290B2

(12) United States Patent
Gimeno Martín et al.

(10) Patent No.: US 12,166,290 B2
(45) Date of Patent: Dec. 10, 2024

(54) FLAT RF TILES FOR MULTIPLE BAND ELECTRICAL STEERABLE ANTENNAS

(71) Applicant: Airbus (S.A.S.), Blagnac (FR)

(72) Inventors: Alejandro Gimeno Martín, Taufkirchen (DE); Michael Fischer, Blagnac (FR); Tobias Chaloun, Blagnac (FR)

(73) Assignee: Airbus (S.A.S.), Blagnac (FR)

(*) Notice: Subject to any disclaimer, the term of this patent is extended or adjusted under 35 U.S.C. 154(b) by 0 days.

(21) Appl. No.: 17/828,514

(22) Filed: May 31, 2022

(65) Prior Publication Data

US 2022/0399643 A1 Dec. 15, 2022
US 2024/0332795 A9 Oct. 3, 2024

(30) Foreign Application Priority Data

Jun. 14, 2021 (EP) ..................................... 21179301
May 18, 2022 (EP) ..................................... 21173966

(51) Int. Cl.
*H01Q 5/30* (2015.01)
*H01Q 1/24* (2006.01)
(Continued)

(52) U.S. Cl.
CPC ............. *H01Q 5/307* (2015.01); *H01Q 1/248* (2013.01); *H01Q 1/28* (2013.01); *H01Q 21/062* (2013.01); *H01Q 21/064* (2013.01)

(58) Field of Classification Search
CPC ........ H01Q 5/307; H01Q 1/28; H01Q 21/062; H01Q 21/064; H01Q 21/0087; H01Q 1/523; H01Q 21/24; H01Q 5/42
See application file for complete search history.

(56) References Cited

U.S. PATENT DOCUMENTS 8,135,338 B1 * 3/2012 Gelon ................ H04B 7/18521 455/13.1
9,419,476 B2 * 8/2016 Mohamadi ............. H01Q 1/248
(Continued)

FOREIGN PATENT DOCUMENTS

CA 3028072 A1 * 7/2019 ............. B64D 45/00
CN 107 579 335 A 1/2018

OTHER PUBLICATIONS

Kuan Min Lee et al, "Dual-band, dual-polarization, interleaved cross-dipole and cavity-backed disc elements phased array antenna", Antennas and Propagation Society International Symposium, IEEE Digest Montreal, Quebec, Canada, Jul. 13-18, 1997, New York, USA, IEEE, pp. 694-697, vol. 2.
(Continued)

*Primary Examiner* — Vibol Tan
(74) *Attorney, Agent, or Firm* — KDW Firm PLLC

(57) ABSTRACT

Flat RF tiles for multiple band electrical steerable antennas. To improve an antenna system for a communication between a vehicle and a satellite, a planar antenna array for multiple band satellite communication includes an array of flat RF tiles. Each RF tile includes a structure of antenna elements, wherein a first antenna element arrangement is configured to radiate in an uplink and downlink portion of a first satellite communication frequency band and a second antenna element arrangement is configured to radiate in an uplink and downlink portion of a second satellite communication frequency band.

19 Claims, 9 Drawing Sheets

(51) Int. Cl.
*H01Q 1/28* (2006.01)
*H01Q 5/307* (2015.01)
*H01Q 21/06* (2006.01)

(56) References Cited

U.S. PATENT DOCUMENTS

| | | | | |
|---|---|---|---|---|
| 9,564,681 | B2 * | 2/2017 | Cordone | H01Q 1/28 |
| 9,577,857 | B2 * | 2/2017 | Lauer | H04W 72/0453 |
| 9,750,079 | B1 * | 8/2017 | Mitchell | H04B 7/18508 |
| 10,886,615 | B2 * | 1/2021 | Gallagher | H01Q 5/42 |
| 2020/0144724 | A1 * | 5/2020 | Farkas | H01Q 21/20 |
| 2020/0243970 | A1 * | 7/2020 | Segador Alvarez | H01Q 5/49 |
| 2021/0249767 | A1 * | 8/2021 | Greenwood | H01Q 21/061 |

OTHER PUBLICATIONS

Luo Qi et al, "Interleaved duel-band circularly polarized active array antenna for satellite communications", 2015 9th European Conference on Antennas and Propagation (EUCAP), Apr. 13, 2015, pp. 1-5.

Jaschke Thomas et al, "Rx/Tx integration concepts for ground segment SatCom antenna arrays", 2016 German Microwave Conference (GEMIC), Institut Fur Mikrowellen Und Antennentechnik-IMA, Mar. 14, 2016, pp. 27-30.

Sandhu Ali Imran et al, "Radiating Elements for Shared Aperture Tx/Rx Phased Arrays at K/Ka Band", IEEE Transactions on Antennas and Propagation, IEEE USA, vol. 64, No. 6, Apr. 11, 2016, pp. 2270-2282.

European Search Report for Application No. 21179301 dated Nov. 26, 2021.

* cited by examiner

FLAT RF TILES FOR MULTIPLE BAND ELECTRICAL STEERABLE ANTENNAS

CROSS-REFERENCE TO RELATED APPLICATIONS

This application claims priority to European Patent Application No. EP 21179301.3 filed Jun. 14, 2021, and European Patent Application No. EP21173966.7 filed May 18, 2022, the entire disclosures of which are incorporated by reference herein.

TECHNICAL FIELD

The disclosure herein relates to a planar antenna array for multiple band satellite communication. Further, the disclosure herein relates to a communication and/or entertainment system comprising such planar antenna array. Further, the disclosure herein relates to an aircraft comprising such communication and/or entertainment system and/or at least one of such planar antenna arrays.

BACKGROUND

Planar antenna arrays are already on market and well known. For example, planar phased antenna arrays are widely used in radar equipment.

In recent time, the demand on further communication possibilities during travel in aircrafts or other vehicles is increasing. A possible solution can be found in broad band satellite communication. There are different providers on the market offering communication services over different satellite communication frequency bands, especially the Ku-band and the Ka-band.

A problem to be solved by the disclosure herein is to provide an antenna structure optimized for installation and use on a vehicle such as an aircraft and enabling both transmitting and receiving data over different frequency bands.

SUMMARY

As a solution for the problem, the disclosure herein provides a planar antenna array.

Advantageous embodiments are disclosed herein.

Communication and/or entertainment systems for vehicles or ground terminals as well as an aircraft equipped with such systems or with the planar antenna array are disclosed herein.

The disclosure herein provides a planar antenna array for multiple band satellite communication comprising an array of flat RF tiles wherein each RF tile includes a structure of antenna elements including:

a first antenna element arrangement configured to radiate in an uplink and downlink portion of a first satellite communication frequency band (e.g. whole satcom Ka-band range); and a second antenna element arrangement configured to radiate in an uplink and downlink portion of a second satellite communication frequency band (e.g. whole satcom Ku-band range).

According to a preferred embodiment, the disclosure herein provides a planar antenna array with two nested antenna elements comprised in a unit cell to provide service in multiple satellite communication bands. The disclosure herein comprises an array of flat RF tiles wherein each RF tile includes a structure of couple radiation elements including a first antenna element arrangement configured to radiate in an uplink and downlink portion of a first satellite communication frequency band and a second antenna element arrangement configured to radiate in an uplink and downlink portion of a second satellite communication frequency band.

Preferably, the first antenna element arrangement is arranged above the second antenna arrangement.

Preferably, a first lattice formed by the first antenna element arrangements of the RF tiles radiates at the first band and a second lattice formed by the second antenna element arrangements of the RF tiles radiates at the second band.

Preferably, the first antenna element arrangement includes first dual polarized antenna elements.

Preferably, the first antenna element arrangement includes at least one dipole antenna.

Preferably, the first antenna element arrangement includes cavity backed dipole elements.

Preferably, the first antenna element arrangement includes a first dipole antenna with a first polarization.

Preferably, the first antenna element arrangement includes a second dipole antenna with a second polarization.

Preferably, the first antenna element arrangement includes a via fence formed by vias connected to a ground plane and surrounding first antenna elements.

Preferably, the first antenna element arrangement includes a ground plane formed by a metallization of the second antenna element arrangement.

Preferably, the first antenna element arrangement includes a distribution layer between first antenna elements and a ground plane, wherein the distribution layer comprises a disc placed below the first antenna elements in order increase the capacitance of the first antenna elements counteracting the inductance of the ground plane and the inductance of the vias attached to the first antenna element such as the dipole element.

Preferably, the first antenna element arrangement includes vias for connecting each of a first and second dipole antenna with a feeding point at the bottom of the RF tile.

Preferably, the first antenna element arrangement includes a balun formed by a first via connection connecting one dipole arm to a feeding point and a second via connection connecting the other dipole arm to a ground plane.

Preferably, the second antenna element arrangement includes second dual polarized antenna elements.

Preferably, the second antenna element arrangement includes at least one slot antenna.

Preferably, the second antenna element arrangement includes cavity backed slot antennas.

Preferably, the second antenna element arrangement includes a first slot antenna with a first polarization.

Preferably, the second antenna element arrangement includes a second slot antenna with a second polarization.

Preferably, the second antenna element arrangement includes a metallization in which at least one slot antenna is formed and which is configured to act as a ground plane for antenna elements of the first antenna element arrangement.

Preferably, the second antenna element arrangement includes a shorted strip line below a slot antenna configured to couple radiation energy into the slot.

Preferably, the first satellite communication frequency band is the Ka-band and the second satellite communication frequency band is the Ku-band, and wherein each RF tile is configured to operate in the Ku-band RX, the Ku-band TX, the Ka-band RX, and the Ka-band TX.

Preferably, each RF tile has a rectangular structure. Preferably, at least one RF tile comprises several cell units.

Preferably, a group of cell units form one RF tile. Preferably, the cell units have a rectangular structure, more preferable a quadratic structure, with a maximum side length of 15 mm, preferably 10 mm.

According to another aspect, the disclosure herein provides a communication system for a vehicle or a ground terminal configured for a multiple band satellite communication, comprising at least one planar antenna array according to any of the embodiments as described above.

According to another aspect, the disclosure herein provides an entertainment system for a vehicle, comprising such a communication system or at least one planar antenna array according to any of the above-mentioned embodiments.

According to another aspect, the disclosure herein provides an aircraft, comprising a communication system, such an entertainment system and/or at least one or a plurality of planar antenna array according to any of the above-mentioned embodiments.

Advantages, effects and preferred features of preferred embodiments of the disclosure herein are described in the following.

Preferred embodiments relate to multi-band satcom systems.

Preferred embodiments of the disclosure herein refer to RF couple structures for satellite dual band systems.

According to a most preferred embodiment, a planar antenna array with two nested antenna element is proposed to provide service in Ku and Ka band satcom.

There are currently no antennas which can cope simultaneously within the same aperture with TX/RX signals at Ku-band and Ka-band. Some approaches discussed previously would require two different apertures (double area).

Up to now, antenna suppliers prefer to have independent antennas to optimize their performance and then deliver only either the Ku or the Ka-band antenna. However, embodiments of the disclosure herein allow to have one aperture which can provide access to both Ku-band and Ka-band satellite links. This feature provides a lot of flexibility during installation in an aircraft, reduces the shadowing effect and enables an airline to be agnostic to the satellite service provider.

One basic idea underlying preferred embodiments of the disclosure herein is to combine different bands in one RF tile. Especially, the disclosure herein proposes flat RF tiles for multiple band electrical steerable antennas.

Preferred embodiments of the disclosure herein relate to an antenna concept which is suitable to be installed on an aircraft or other similar vehicles and allows a very flexible connection to different data communication sources. RF tiles according to embodiments of the disclosure herein can be used to build up a planar array antenna at Ku and Ka-band in both TX and RX direction. The array antenna could be part of the communication and/or entertainment system in an aircraft, drone, helicopter or even a ground terminal (including ground vehicles).

Planar phased array antennas are already on the market, but they do not combine typically different RX/TX satellite bands, such as Ku- and Ka-band, on the same aperture. The upside of not doing it is the clear optimization of the antenna elements for a specific band, whereas the downside is the need of a larger area (at least one aperture per band).

Embodiments of the disclosure herein have the following advantages over conventional antenna designs when it is required to use different bands, such as Ku- and Ka-bands:

- Only one installation of one aperture on an aircraft or other vehicle is necessary instead of four different apertures to provide Ku- and Ka-band comm links, hence the installation is easier.
- Possibility to reduce the shadowing effect from the vehicle. When requiring Ku-band TX, Ku-band RX, Ka-band TX and Ka-band RX apertures, some of them will be more impacted by the shadowing of VTP, wings or aircraft body.
- Airlines do not need to select in advance to start operation, the frequency band (and satcom provider). Therefore, they have large flexibility after the antenna installation to change from one operator in one band to an operator in another band.
- Possibility to reduce turbulent flow.

According to a preferred embodiment, the proposed antenna array design is based on a scalable antenna design built up by several flat RF tiles (preferably <10 mm). Each of these tiles is preferably formed by a structure of couple radiating elements. One lattice on top radiates at one band, whereas a lattice at the bottom radiates at the other one.

For example, each RF tile can operate in:

Ku-band RX,

Ku-band TX,

Ka-band RX,

Ka-band TX

One aperture is formed by several RF tiles.

When a vehicle may require the use of different bands, such as this is the case for Ka and Ku-band satcom links, the advantage of the proposed aperture is:

- More flexibility in the installation.
- Lower shadowing effect. Having all in one aperture means that the antenna can be configured to not use areas strongly affected by shadowing or other reflections.
- Preferred embodiments of the disclosure herein will allow to be initially agnostic to the satellite service provider. The airline could have two or more satcom providers, one in Ku-band and one in Ka-band and select one or another depending which one provides better coverage.

BRIEF DESCRIPTION OF THE DRAWINGS

Embodiments of the disclosure herein are explained in more detail referring to the attached drawings in which.

DETAILED DESCRIPTION

Figure 1:
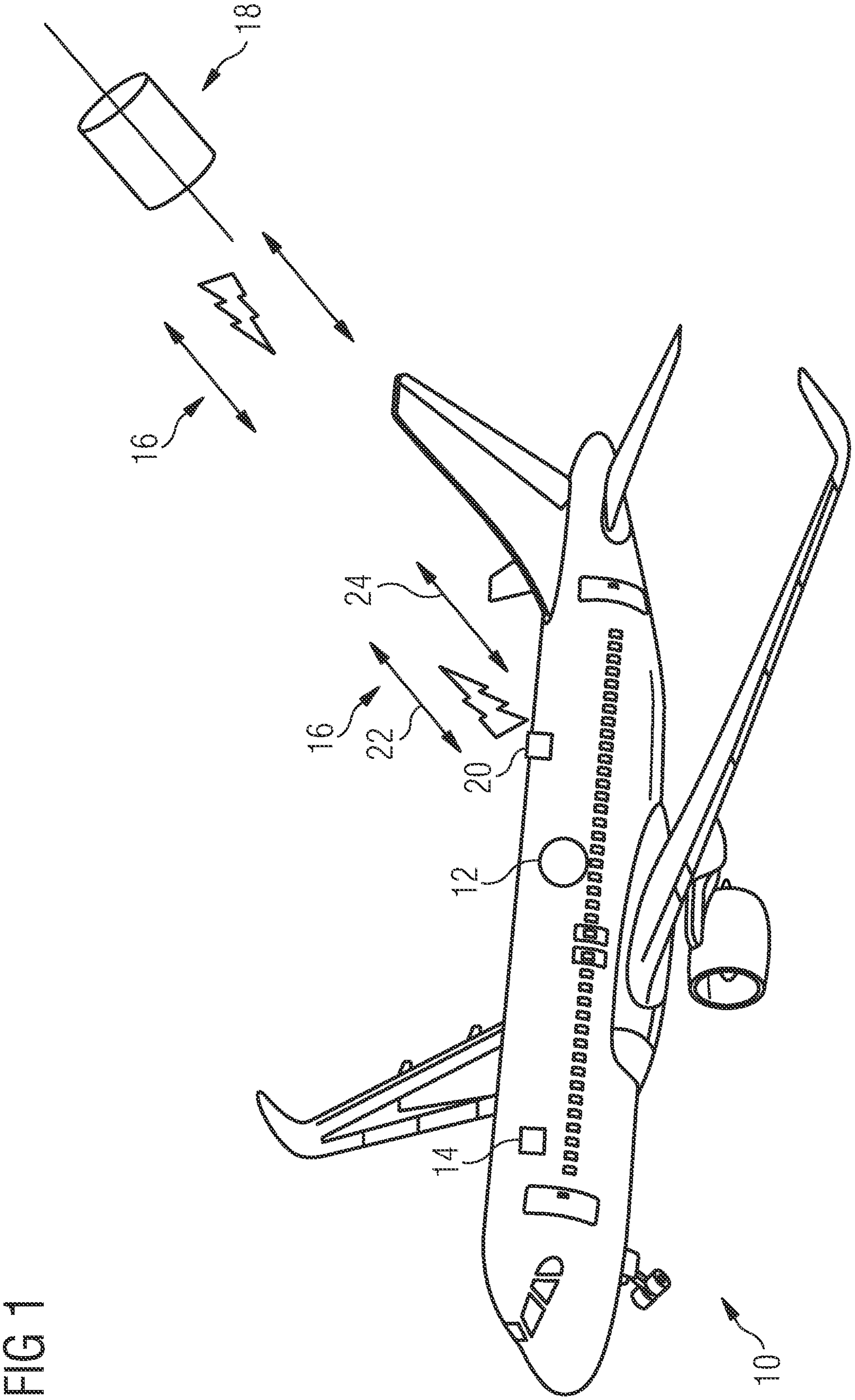
FIG. 1 is a schematic perspective view showing a vehicle, here an aircraft, equipped with an entertainment system and a satellite communication system wherein radiation is transmitted and received to and from a satellite by a planar antenna array.

FIG. 1 shows an aircraft 10 having an entertainment system 12 and a communication system 14. The entertainment system 12 and the communication system 14 enable, for example, access to the internet or other data sources via satellite communication links 16 connected to a satellite 18.

For radiation of corresponding RF signals, the aircraft 10 has a planar antenna array 20 which is configured to transmit and receive signals over an uplink and downlink portion of a first satellite communication frequency band 22 and over an uplink and downlink portion of a second satellite communication frequency band 24. According to a preferred embodiment, the first satellite communication frequency band 18 is the Ka-band, and the second satellite communication frequency band 20 is the Ku-band.

Figure 2A:
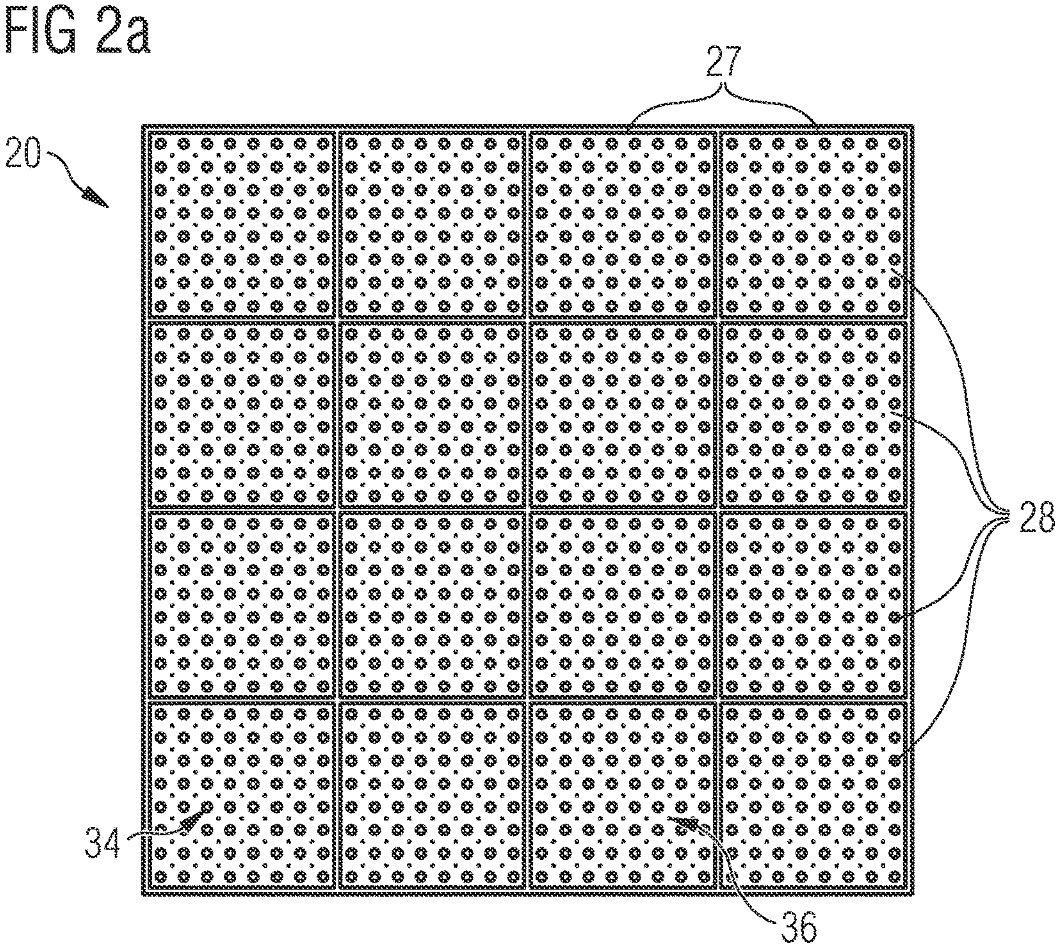
FIG. 2*a* is a schematic planar view showing an example of the planar antenna array.
Figure 2B:
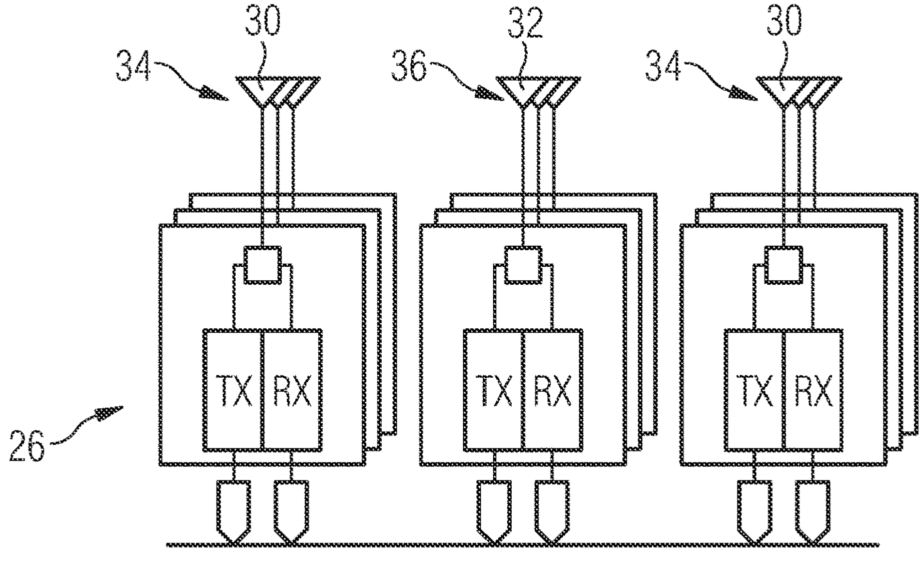
FIG. 2*b* is a schematic view showing the architecture of the transmitter and receiver device of the satellite communication system of the aircraft of FIG. 1.

FIGS. 2*a* and 2*b* show schematically the architecture of a satellite transceiver 26 using the planar antenna array 20. The planar antenna array 20 comprises an array of RF tiles 27 comprising RF unit cells 28. Further the planar antenna array 20 comprises first antenna element arrangements 30 radiating at the downlink portion RX and at the uplink portion TX of the Ka band and second antenna element arrangements 32 radiating at the downlink portion RX and at the uplink portion TX of the Ku band. According to embodiments as shown in the following figures, each RF tile 27 comprises a first antenna element arrangement 30 and a second antenna element arrangement 32 so that each RF tile 27 can operate in the uplink/downlink portions of both the Ka and Ku bands. All first antenna element arrangements 30 of all the RF tiles 27 of the planar antenna array 20 establish a first lattice 34 operating in the Ka band, and all second antenna element arrangements 32 of all the RF tiles 27 of the planar antenna array 20 establish a second lattice 36 operating in the Ku band. Since the antenna aperture would be larger than required for Ka-band satcom services, the planar antenna array 20 may not necessarily require full integration of transceivers, or all being simultaneously active. As a consequence, the phased array system at Ka-band might be implemented as a sparse array.

In embodiments shown, the aperture is larger than required for Ka band satcom services, therefore the planar antenna array may not necessarily be fully populated with Ka band transceivers. As a consequence, the phased array systems at Ka band might also be implemented as a sparse array.

The antenna concept is based on a fully federated antenna system. In a fully federated antenna system, the radiating elements share the same aperture for the different transmit and receive bands.

The coupling among elements is defined to avoid the influence of one element with another of the same type, and with another of different type. To achieve a good decoupling among elements is key to avoid leakage between bands, which would degrade the overall antenna performance.

Two different types of dual polarized antenna elements 38, 40 operating either in the Ku or the Ka band are used. The top system architecture is shown in FIGS. 2*a* and 2*b*, in which an interleaved array configuration with two different array lattices 34, 36 acts as a first duplexing stage.

In the following embodiments of RF tiles 28 that fulfil the afore mentioned requirements are explained below with reference to FIGS. 3 through 10.

Figure 8:
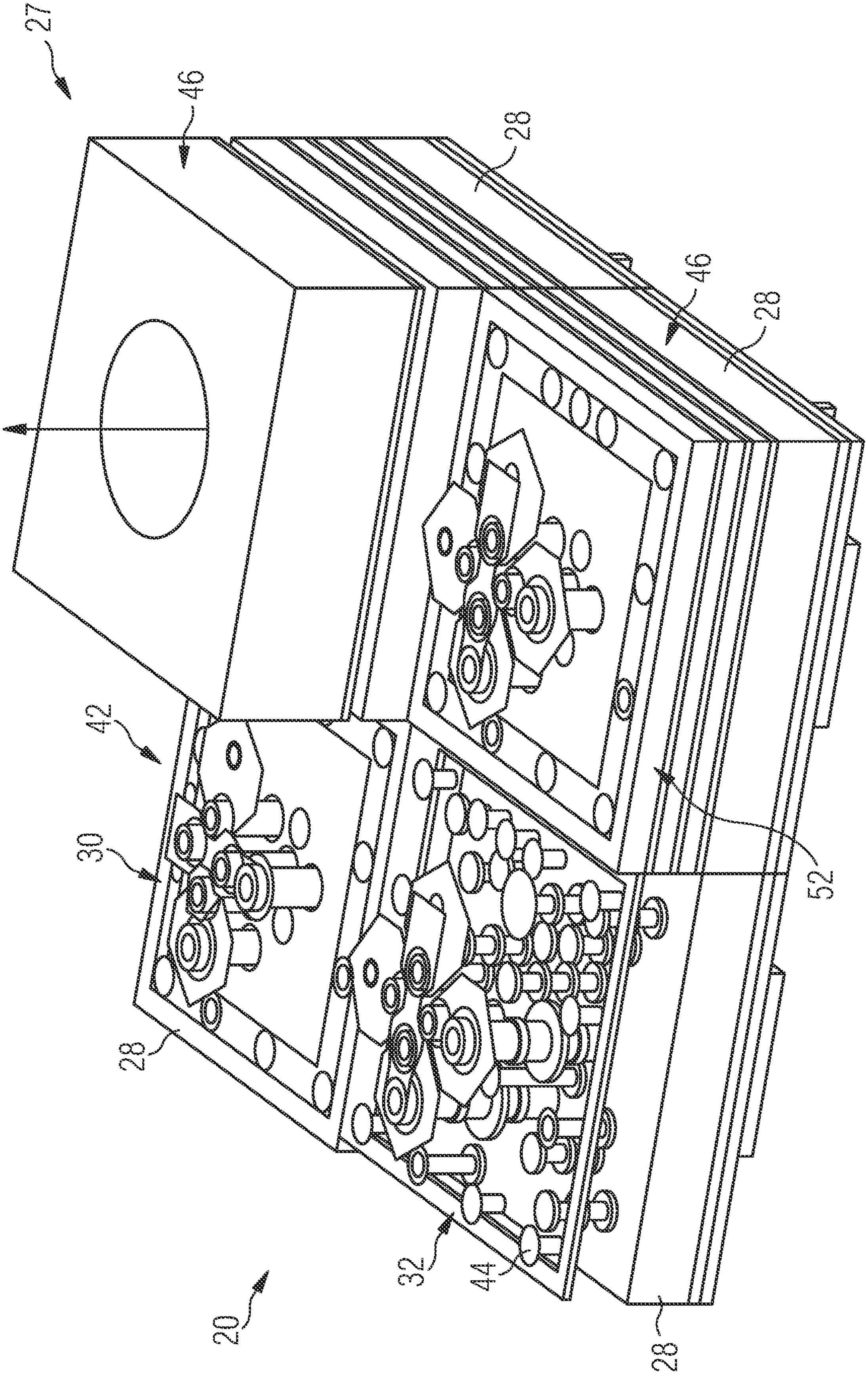
FIG. 8 is a perspective view of four unit cells within a RF tile of the planar antenna array of FIG. 2, wherein one is shown with the dielectric packaging, two with upper parts of the dielectric broken away, and one with further parts of the dielectric and the ground plane broken away.

Each RF tile 27 is comprised of several RF unit cells 28. For example, four, six, eight, . . . RF unit cells form one RF tile 27. According to preferred embodiments, $2^n$ unit cells 28 form one RF tile 27. In the embodiment of FIG. 2*a*, 8×8=64 unit cells 28 form one RF tile 27.

Figure 3:
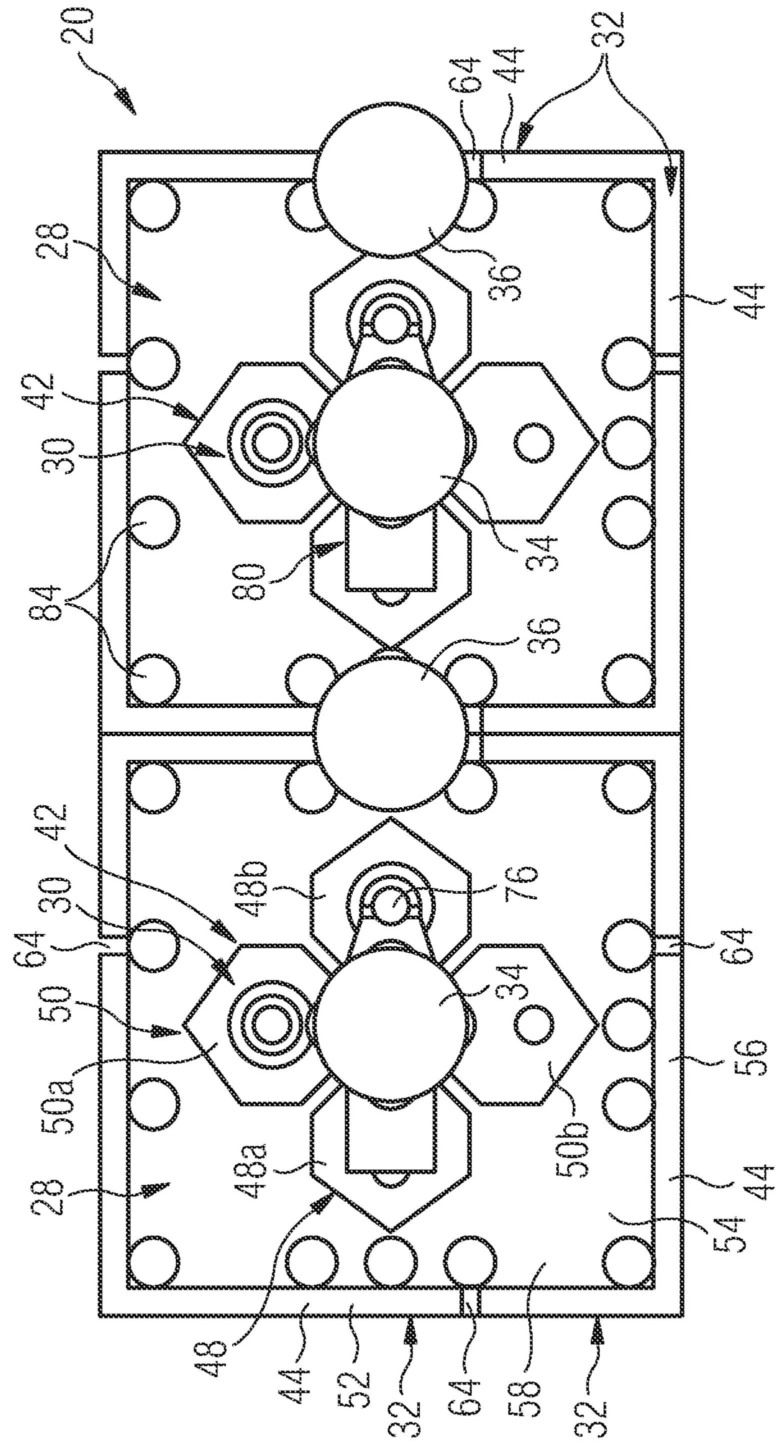
FIG. 3 is a plan view on two adjacent unit cells within a RF tile of the planar antenna array of FIG. 2 wherein a dielectric package has been omitted for explanatory purposes.

FIG. 3 depicts two RF unit cells 28 of an interleaved array configuration establishing the two regular lattices 34, 36. In this nested arrangement, two antenna types—i.e., here the first and second antenna elements 38, 40— are considered for Ku and Ka band operating in the associated uplink/downlink bands simultaneously. The first antenna element arrangement 32 uses a first type of antenna elements 38 while the second antenna element arrangement 34 uses a second type of antenna elements 40.

The unit cell 28 is a rectangular structure which can be duplicated in both lateral directions to form a tile 27. In the fully federated approach, the unit cell 28 contains both antenna elements 38, 40 for the Ku and Ka band.

In the design of the embodiments shown, dipole antennas 42 for the Ka band and slot antennas 44 for the Ku band are deployed in an interleaved fashion. By exploiting the self-diplexing properties of this interleaved array configuration, the implementation of a diplexer separation the Ku and Ka band satcom services can be avoided.

In the embodiment of the planar antenna array 20 as shown in FIGS. 2*a*/2*b* and 3, two antenna designs are selected. Preferably, a dipole antenna 42 is selected for the Ka-band. The Ka band antenna needs to cover the frequency ranges from 18.3 GHz to 21.1 GHz for the receive case and 27.5 GHz to 31.0 GHz for the transmit case. For both frequency bands a connected dipole antenna can be used. In principle this antenna type is an array consisting of dipole antennas. Preferably, a slot antenna is selected for the Ku-band. The Ku-band covers the frequency ranges from 10.7 GHz to 12.75 GHz for the receive case and 13.75 GHz to 14.5 GHz for the transmit case. Similar to the dipole antenna design, the array of connected slot antennas is used to cover these two bands simultaneously.

Referring now to FIGS. 3 through 10, a preferred structure of each of the RF tiles 27 with the first antenna element arrangement 30 including the dipole antenna 42 as the first antenna elements 38 and the second antenna element arrangement 32 including the slot antenna 44 as the second antenna elements is explained in more detail.

Figure 4:
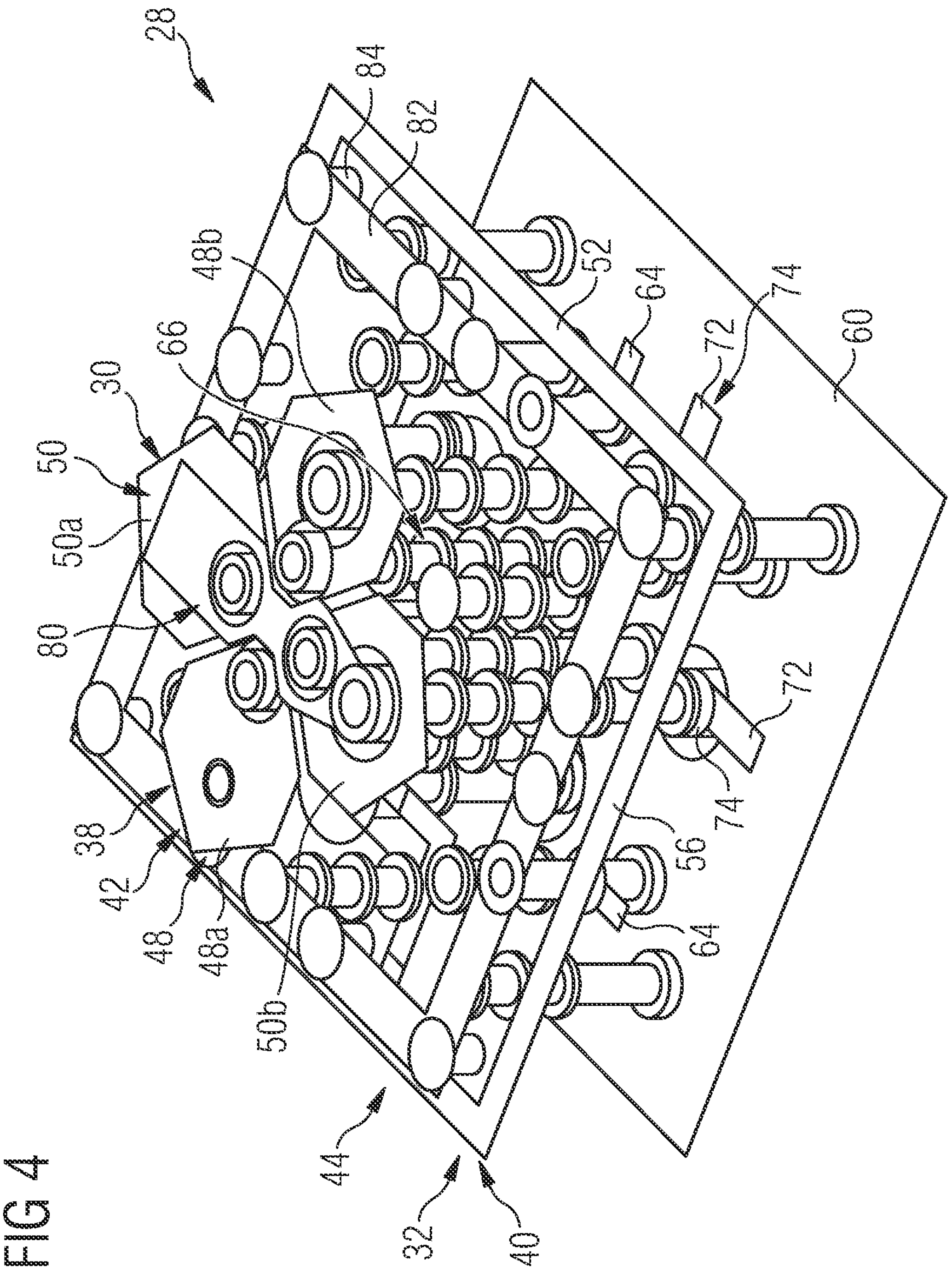
FIG. 4 is a perspective view of metallic parts of one of the RF tiles, wherein one ground plane which also constitutes slots of a slot antenna arrangement has been omitted while the slots have been indicated in black lines.
Figure 5:
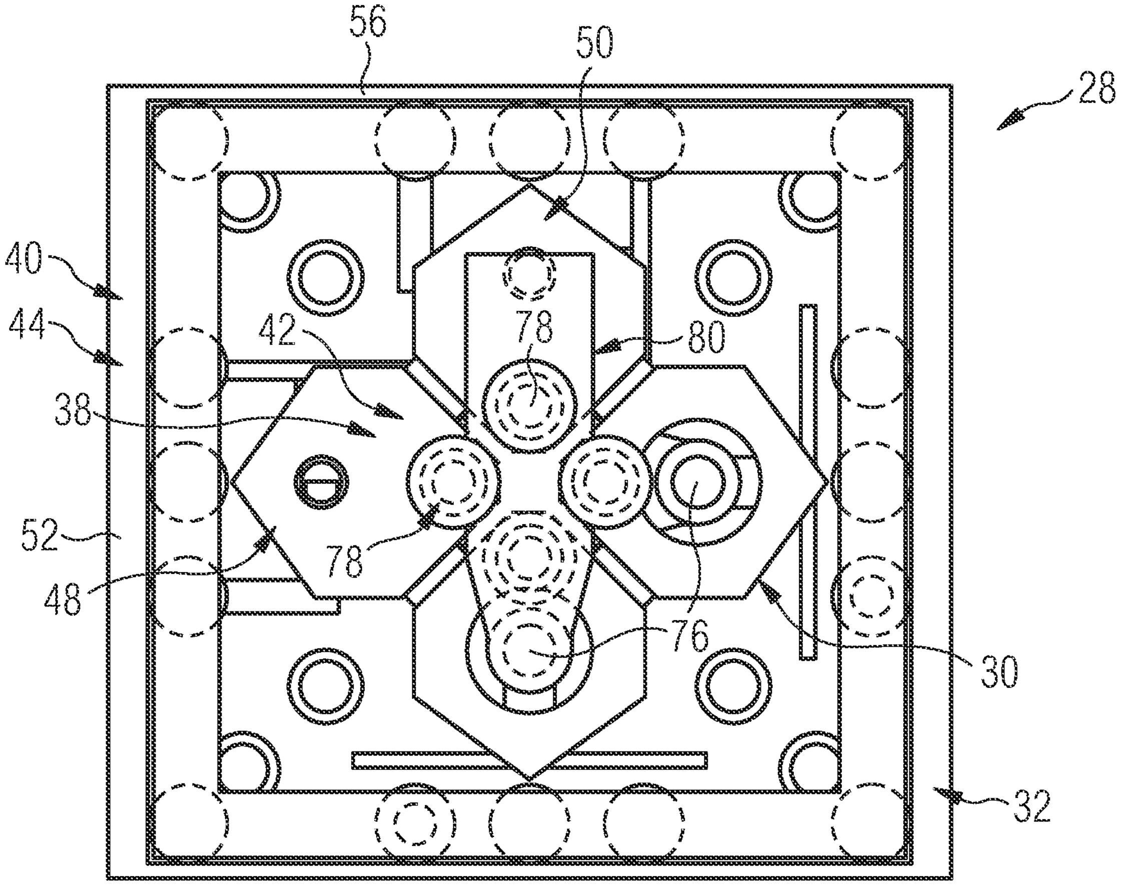
FIG. 5 is a plan view on the unit cell within a RF tile shown as in FIG. 4.
Figure 6:
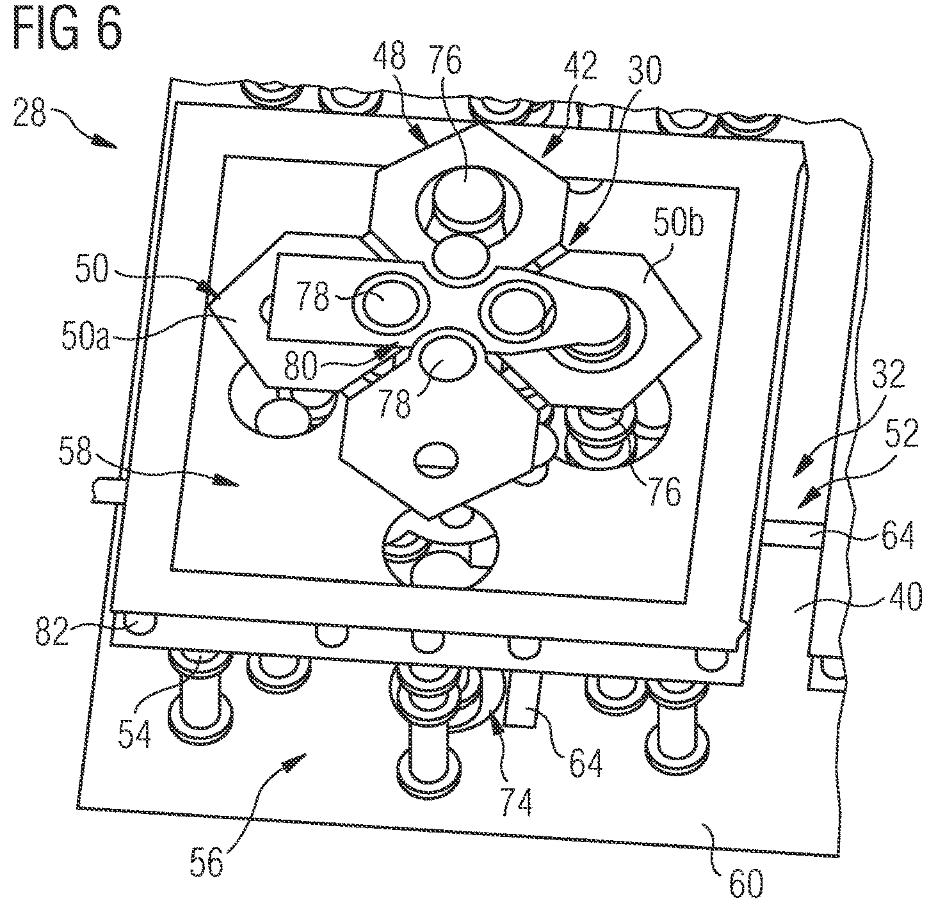
FIG. 6 is a perspective view on the metallic parts of the unit cell within a RF tile including the ground plane.
Figure 7:
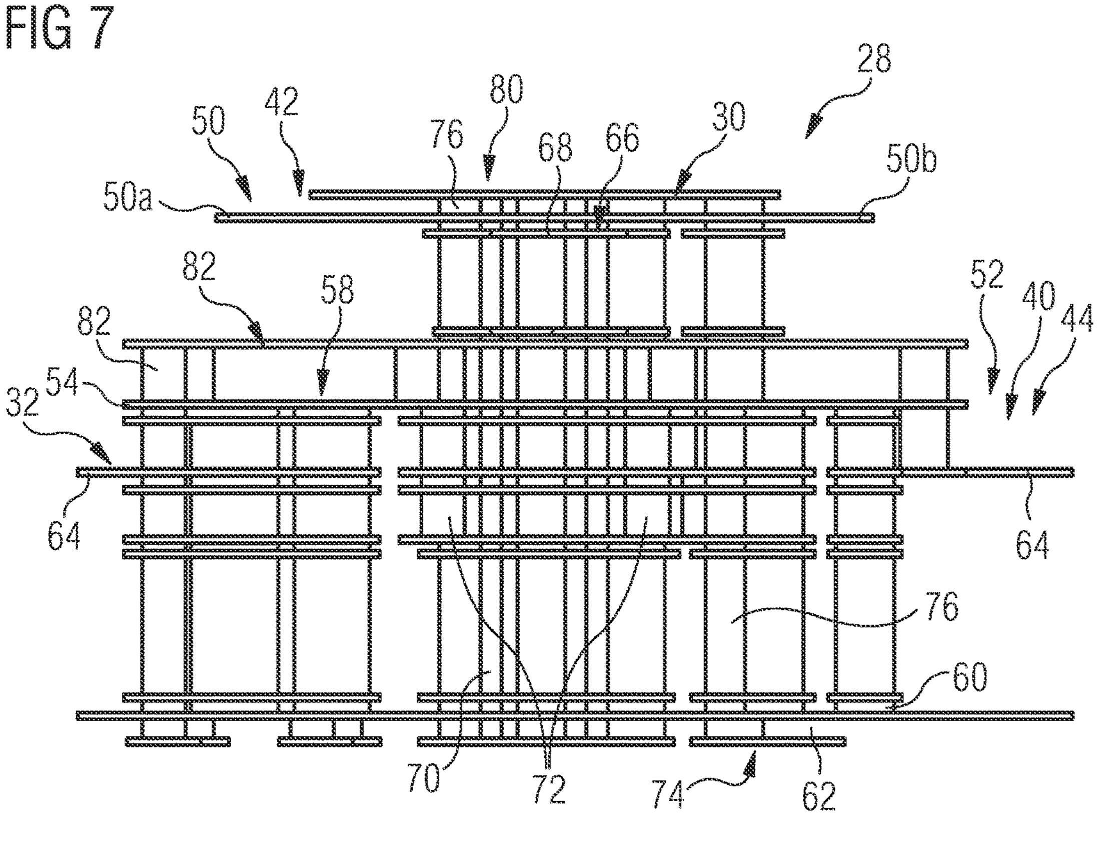
FIG. 7 is a side view of the metallic parts of the unit cell within a RF tile shown as in FIG. 6.
Figure 9:
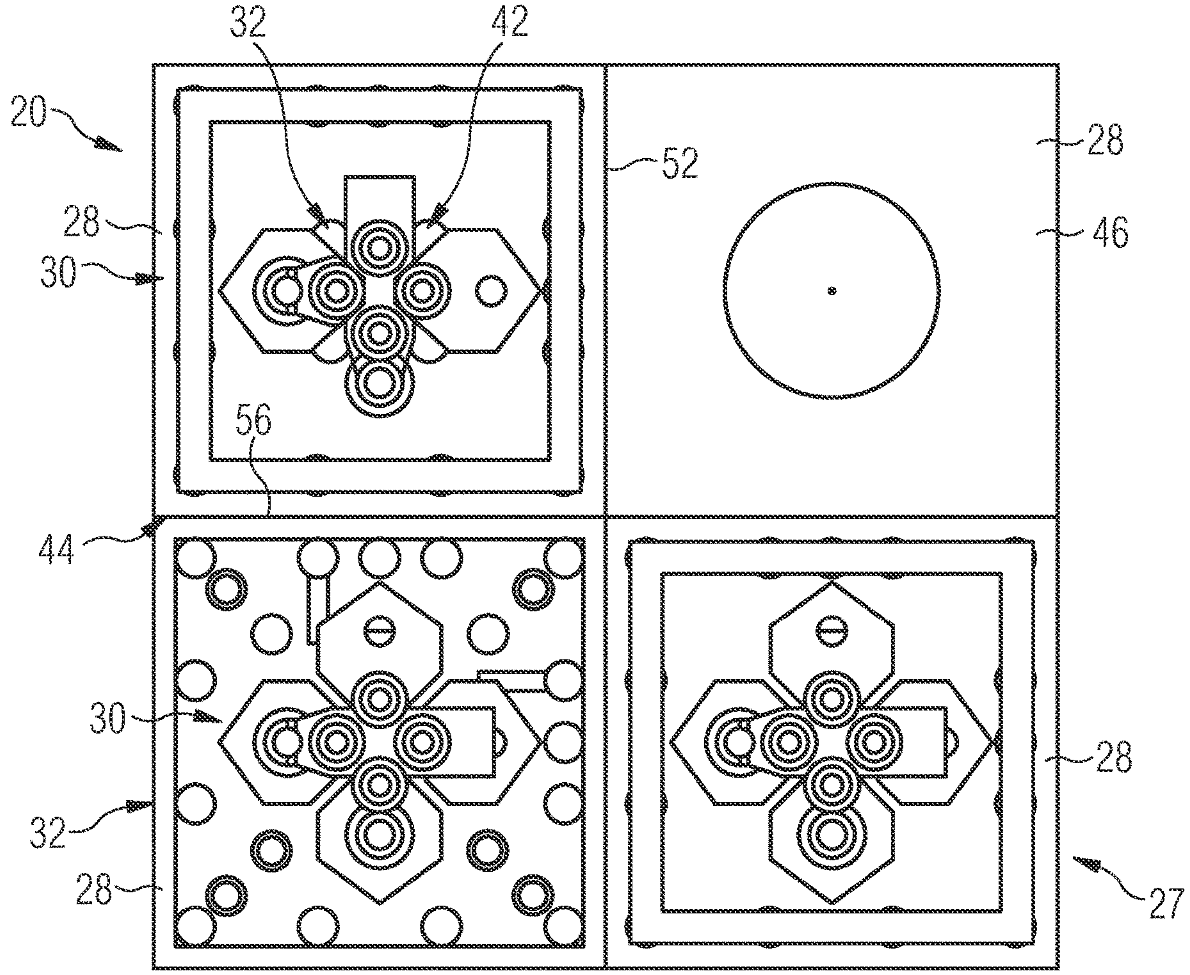
FIG. 9 is a top view of the structure as shown in FIG. 8.

FIGS. 4 and 5 show different views of metallic parts of the unit cells 28 within the RF tiles 27, where a metallization for forming the slot antennas 44 is omitted in order to show the inner structures. The slots of the slot antenna 44 are shown as black bars. FIGS. 6 and 7 show all the metallic portions of the unit cells 28 within the RF tiles 27. FIGS. 8 and 9 show different views of a part of the planar antenna array 20 including four unit cells 28 within the RF tiles 27, wherein one of the unit cells 28 is shown with a package made from a dielectric material 46, two of the unit cells 28 are shown with the upper part of the dielectric material 46 broken away to show the dipole antenna 42, and the fourth unit cell 28 is shown as also depicted in FIGS. 4 and 5 where the metallization for forming the slot antennas 44 is also omitted. FIG.

10 shows a perspective view of the metallic parts of one unit cell 28 within the RF tile 27 according to a slightly modified further embodiment.

As shown in FIGS. 3 through 10, a connected dipole antenna 42 and connected slot antennas 44 are tightly nested within a unit cell 28. These two antennas are stacked over each other as illustrated. Basically, the design can be separated in two parts. The lower part—the second antenna element arrangement 32—contains the cavity-backed slot antennas 44 and the upper part—the first antenna element arrangement 30—contains the cavity backed dipole elements 48, 50.

As especially shown in FIGS. 3 and 5 to 7 and 10, the dipole antenna 42 comprises a first dipole 48 for a first polarization and a second dipole 50 for the second polarization. Each dipole 48, 50 is constituted by two dipole arms **48*a*, 48*b*, 50*a*, 50*b***.

The slot antenna 44 comprises a first slot 52 for the first polarization defined at a first edge of a metallization layer 54 and a second slot 56 for the second polarization defined at a second edge of the metallization layer 54.

In this design approach the metallization layer 54 in which the slot antenna 44 is situated also serves as a ground plane 58 for the dipole antenna 42.

On a bottom layer 60 below the ground plane 58, microstrip lines 62 are used to route the feeding network of the antennas 42, 44, see FIGS. 4 and 10.

Below the slot antenna 44 a shorted strip line 64 is used to couple the energy into the slot 52, 56, see FIGS. 3, 4, 6, 7, 9, and 10.

Below the dipole antenna 42 an additional distribution layer 66 is provided. In this layer 66 a disc 68 is placed under the dipole antenna 42 to increase the capacitance of the dipole antenna 42 counteracting the inductance of the ground plane 58. Also, connect strip lines 70 are used to connect two parts of a via 72 which can't be realized in one via process. These vias 72 are connected to one of the two dipole arms **48*a*, 48*b*, 50*a*, 50*b*** for each polarization to suppress the common mode.

The signal from the feeding point on the bottom of the unit cell 28 is guided by signal vias 76 to the antenna elements 38, 40. In the case of the dipole antenna 42, one dipole arm **48*a*, 50*a* is connected by a signal via 76 to the feeding and the other is shorted by a ground via 78 via to the ground plane 58. This structure acts as a balun 80**.

By a central feeding of the dipole antenna 42 a larger distance can be obtained to the slot antenna 44 so that there is less tendency for inter-element couplings.

The slots 52, 56 are arranged between the ground plane metallization layer 54 of adjacent unit cells 28, and hence at the borders of the unit cells 28.

A via fence 82 has been implemented as an additional countermeasure to overcome inter-element couplings and mutual coupling. The via fence 82 comprises uniformly spaced vias 84 surrounding the slot antenna. By introducing the via fence 82, the coupling coefficient between the dipole antennas 42 in the Ka-band could be reduced. Another positive aspect of this approach is the increase of the slot antenna's 44 radiation efficiency. The reason can be found in the more confident electromagnetic fields of the slot antenna due to the via fence. Preferably the height of the via fence 82 is chosen to be about half the distance between slot antenna 44 and the dipole antenna 42.

Figure 10:
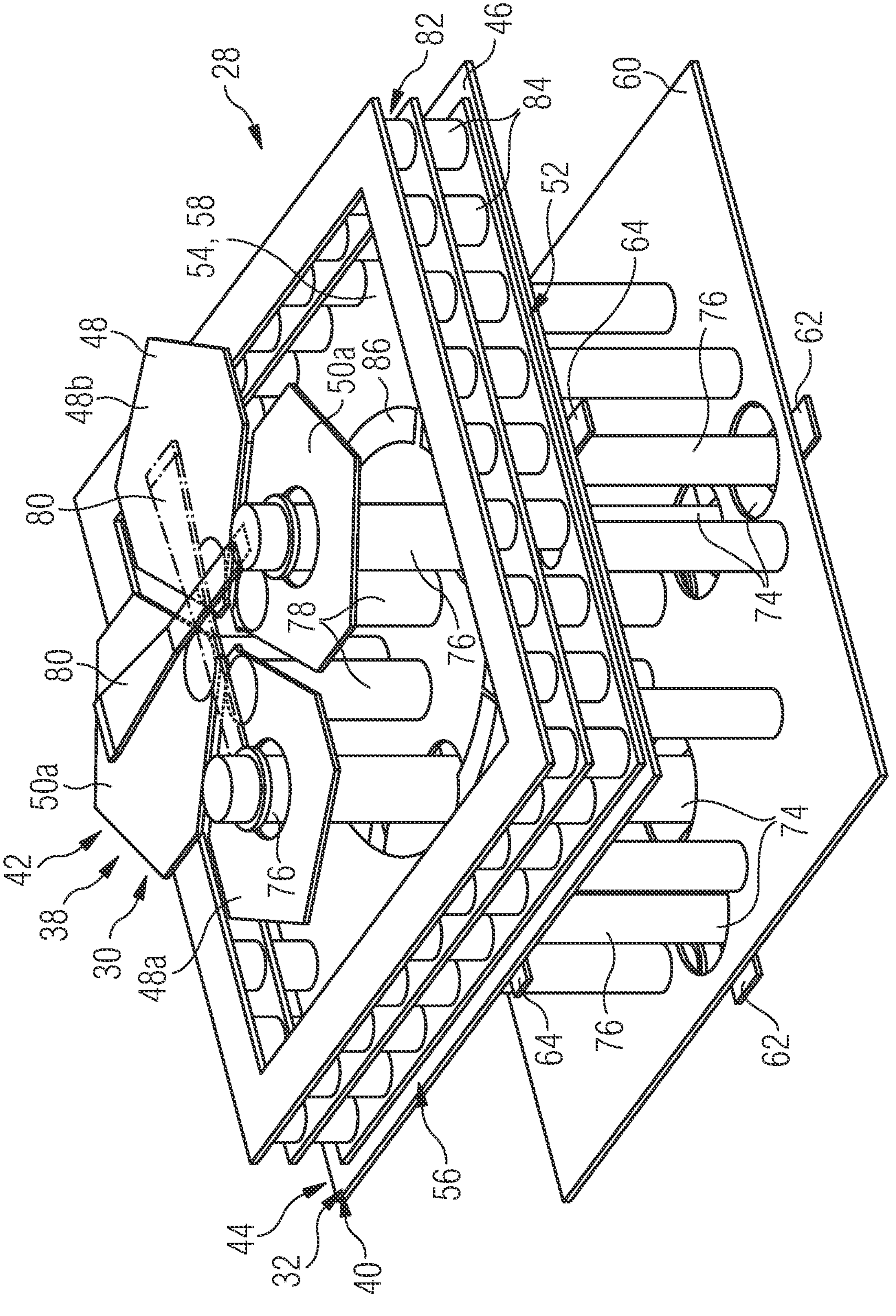
FIG. 10 is a perspective view of the metallic parts of a unit cell within a RF tile of the planar antenna array according to another embodiment.

As a further measure for decoupling, cuts 86 can be provided in the ground plane 58 to disturb a current flow between the dipole antenna 42 and the slot antenna 44, see FIG. 10.

The subject matter disclosed herein can be implemented in or with software in combination with hardware and/or firmware. For example, the subject matter described herein can be implemented in or with software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST

10 aircraft
12 entertainment system
14 communication system
16 satellite communication links
18 satellite
20 planar antenna array
22 first satellite communication frequency band (for example: Ka-band)
24 second satellite communication frequency band (for example: Ku-band)
26 satellite transceiver
27 RF tile
28 unit cell
30 first antenna element arrangement
32 second antenna element arrangement
34 first lattice
36 second lattice
38 first antenna element
40 second antenna element
42 dipole antenna
44 slot antenna
46 dielectric material
48 first dipole element
**48*a*** dipole arm
**48*b*** dipole arm
50 second dipole element
**50*a*** dipole arm
**50*b*** dipole arm
52 first slot
54 metallization layer for forming the slot antenna

56 second slot
58 ground plane
60 bottom layer
62 microstrip line
64 strip line (delivering radiation energy to slot antenna)
66 distribution layer
68 disc
70 strip line
72 via
74 feeding point
76 signal via
78 ground via
80 balun
82 via fence
84 vias of the via fence
86 slot in ground plane

The invention claimed is:

1. A planar antenna array for multiple band satellite communication comprising an array of flat RF tiles, wherein each RF tile includes a structure of antenna elements comprising:

a first antenna element arrangement configured to radiate in an uplink portion TX and a downlink portion RX of a Ka-band; and a second antenna element arrangement configured to radiate in an uplink portion TX and a downlink portion RX of a Ku-band, wherein the first antenna element arrangement comprises at least one or a plurality of:

dual polarized first antenna elements;

cavity backed dipole elements;

a first dipole element with a first polarization;

a second dipole element with a second polarization;

a via fence formed by vias connected to a ground plane and arranged between first antenna elements of the first antenna arrangement and second antenna elements of the second antenna arrangement;

a ground plane formed by a metallization layer of the second antenna element arrangement;

a distribution layer between first antenna elements and a ground plane, wherein the distribution layer comprises a disc placed below the first antenna elements to increase a capacitance of the first antenna elements counteracting an inductance of the ground plane and an inductance of vias attached to the first antenna element;

vias for connecting each of a first and second dipole elements with a feeding point at a bottom of the RF tile; and a balun formed by a first via connection connecting one dipole arm to a feeding point and a second via connection connecting another dipole arm to a ground plane.

2. The planar antenna array according to claim 1, wherein the first antenna element arrangement is above the second antenna arrangement.

3. The planar antenna array according to claim 1, wherein the first antenna element arrangements of the RF tiles form a first lattice that radiates at the Ka-band and the second antenna element arrangements of the RF tiles form a second lattice that radiates at the Ku-band.

4. A planar antenna array for multiple band satellite communication comprising an array of flat RF tiles, wherein each RF tile includes a structure of antenna elements comprising:

a first antenna element arrangement configured to radiate in an uplink portion TX and a downlink portion RX of a Ka-band; and a second antenna element arrangement configured to radiate in an uplink portion TX and a downlink portion RX of a Ku-band, wherein the second antenna element arrangement comprises at least one or a plurality of:

dual polarized second antenna elements;

at least one slot antenna;

a first antenna slot with a first polarization;

a second antenna slot with a second polarization;

a metallization layer, in which at least one slot antenna is arranged, wherein the metallization layer is configured to act as a ground plane for first antenna elements of the first antenna element arrangement; and a strip line below a slot antenna configured to couple radiation energy into a slot.

5. The planar antenna array according to claim 1, wherein each RF tile comprises a plurality of unit cells having a rectangular structure with a maximum side length of 15 mm, or 10 mm.

6. A communication system for a vehicle or a ground terminal configured for a multiple band satellite communication, the communication system comprising at least one planar antenna array according to claim 1.

7. An entertainment system for a vehicle, the entertainment system comprising a communication system of claim 6.

8. An entertainment system for a vehicle, the entertainment system comprising at least one planar antenna array according to claim 1.

9. An aircraft comprising the communication system according to claim 6.

10. An aircraft comprising the entertainment system according to claim 7.

11. An aircraft comprising the planar antenna array according to claim 1.

12. The planar antenna array according to claim 1, wherein the first antenna element arrangement comprises at least one dipole antenna.

13. The planar antenna array according to claim 4, wherein the second antenna element arrangement comprises cavity backed slot antennas.

14. The planar antenna array according to claim 1, wherein the first antenna element arrangement comprises two or more of:

dual polarized first antenna elements;

at least one dipole antenna;

cavity backed dipole elements;

a first dipole element with a first polarization;

a second dipole element with a second polarization;

a via fence formed by vias connected to a ground plane and arranged between first antenna elements of the first antenna arrangement and second antenna elements of the second antenna arrangement;

a ground plane formed by a metallization layer of the second antenna element arrangement;

a distribution layer between first antenna elements and a ground plane, wherein the distribution layer comprises a disc placed below the first antenna elements to increase a capacitance of the first antenna elements counteracting an inductance of the ground plane and an inductance of vias attached to the first antenna element;

vias for connecting each of a first and second dipole elements with a feeding point at a bottom of the RF tile; and a balun formed by a first via connection connecting one dipole arm to a feeding point and a second via connection connecting another dipole arm to a ground plane.

15. The planar antenna array according to claim 14, wherein the second antenna element arrangement comprises two or more of:
- dual polarized second antenna elements;
- at least one slot antenna;
- cavity backed slot antennas;
- a first antenna slot with a first polarization;
- a second antenna slot with a second polarization;
- a metallization layer in which at least one slot antenna is arranged and which is configured to act as a ground plane for first antenna elements of the first antenna element arrangement; and
- a strip line below a slot antenna configured to couple radiation energy into a slot.

16. The planar antenna array according to claim 1, wherein the second antenna element arrangement comprises two or more of:
- dual polarized second antenna elements;
- at least one slot antenna;
- cavity backed slot antennas;
- a first antenna slot with a first polarization;
- a second antenna slot with a second polarization;
- a metallization layer in which at least one slot antenna is arranged and which is configured to act as a ground plane for first antenna elements of the first antenna element arrangement; and
- a strip line below a slot antenna configured to couple radiation energy into a slot.

17. The planar antenna array according to claim 1, wherein:

the first antenna element arrangement comprises three or more of:
- dual polarized first antenna elements;
- at least one dipole antenna;
- cavity backed dipole elements;
- a first dipole element with a first polarization;
- a second dipole element with a second polarization;
- a via fence formed by vias connected to a ground plane and arranged between first antenna elements of the first antenna arrangement and second antenna elements of the second antenna arrangement;
- a ground plane formed by a metallization layer of the second antenna element arrangement;
- a distribution layer between first antenna elements and a ground plane, wherein the distribution layer comprises a disc placed below the first antenna elements to increase a capacitance of the first antenna elements counteracting an inductance of the ground plane and an inductance of vias attached to the first antenna element;
- vias for connecting each of a first and second dipole elements with a feeding point at a bottom of the RF tile; and
- a balun formed by a first via connection connecting one dipole arm to a feeding point and a second via connection connecting another dipole arm to a ground plane; and the second antenna element arrangement comprises three or more of:
- dual polarized second antenna elements;
- at least one slot antenna;
- cavity backed slot antennas;
- a first antenna slot with a first polarization;
- a second antenna slot with a second polarization;
- a metallization layer, in which at least one slot antenna is arranged, wherein the metallization layer is configured to act as a ground plane for first antenna elements of the first antenna element arrangement; and
- a strip line below a slot antenna configured to couple radiation energy into a slot.

18. A planar antenna array for multiple band satellite communication comprising an array of flat RF tiles, wherein each RF tile includes a structure of antenna elements comprising:

a first antenna element arrangement configured to radiate in an uplink portion TX and a downlink portion RX of a Ka-band, the first antenna element arrangement comprising:
- dual polarized first antenna elements;
- at least one dipole antenna;
- cavity backed dipole elements;
- a first dipole element with a first polarization;
- a second dipole element with a second polarization;
- a via fence formed by vias connected to a ground plane and arranged between first antenna elements of the first antenna arrangement and second antenna elements of the second antenna arrangement;
- a ground plane formed by a metallization layer of the second antenna element arrangement;
- a distribution layer between first antenna elements and a ground plane, wherein the distribution layer comprises a disc placed below the first antenna elements to increase a capacitance of the first antenna elements counteracting an inductance of the ground plane and an inductance of vias attached to the first antenna element;
- vias for connecting each of a first and second dipole elements with a feeding point at a bottom of the RF tile; and
- a balun formed by a first via connection connecting one dipole arm to a feeding point and a second via connection connecting another dipole arm to a ground plane; and a second antenna element arrangement configured to radiate in an uplink portion TX and a downlink portion RX of a Ku-band, the second antenna element arrangement comprising:
- dual polarized second antenna elements;
- at least one slot antenna;
- cavity backed slot antennas;
- a first antenna slot with a first polarization;
- a second antenna slot with a second polarization;
- a metallization layer, in which at least one slot antenna is arranged, wherein the metallization layer is configured to act as a ground plane for first antenna elements of the first antenna element arrangement; and
- a strip line below a slot antenna configured to couple radiation energy into a slot.

19. A planar antenna array for multiple band satellite communication comprising an array of flat RF tiles, wherein each RF tile includes a structure of antenna elements comprising:

a first antenna element arrangement configured to radiate in an uplink portion TX and a downlink portion RX of a Ka-band, the first antenna element arrangement comprising at least two of:
- dual polarized first antenna elements;
- at least one dipole antenna;

cavity backed dipole elements;

a first dipole element with a first polarization;

a second dipole element with a second polarization;

a via fence formed by vias connected to a ground plane and arranged between first antenna elements of the first antenna arrangement and second antenna elements of the second antenna arrangement;

a ground plane formed by a metallization layer of the second antenna element arrangement;

a distribution layer between first antenna elements and a ground plane, wherein the distribution layer comprises a disc placed below the first antenna elements to increase a capacitance of the first antenna elements counteracting an inductance of the ground plane and an inductance of vias attached to the first antenna element;

vias for connecting each of a first and second dipole elements with a feeding point at a bottom of the RF tile; and a balun formed by a first via connection connecting one dipole arm to a feeding point and a second via connection connecting another dipole arm to a ground plane; and a second antenna element arrangement configured to radiate in an uplink portion TX and a downlink portion RX of a Ku-band, the second antenna element arrangement comprising at least two of:

dual polarized second antenna elements;

at least one slot antenna;

cavity backed slot antennas;

a first antenna slot with a first polarization;

a second antenna slot with a second polarization;

a metallization layer, in which at least one slot antenna is arranged, wherein the metallization layer is configured to act as a ground plane for first antenna elements of the first antenna element arrangement; and a strip line below a slot antenna configured to couple radiation energy into a slot;

wherein the first antenna element arrangement is above the second antenna arrangement;

wherein the first antenna element arrangements of the RF tiles form a first lattice that radiates at the Ka-band and the second antenna element arrangements of the RF tiles form a second lattice that radiates at the Ku-band; and wherein each RF tile comprises a plurality of unit cells having a rectangular structure with a maximum side length of 15 mm, or 10 mm.

* * * * *